Aug. 27, 1940. A. W. OEHLER ET AL Re. 21,542

CORN PICKER

Original Filed Jan. 10, 1936 4 Sheets-Sheet 1

INVENTOR
Alvin W. Oehler & Ralph L. Anderson
BY
Brown, Jackson, Boettcher & Dienner
ATTORNEYS.

Aug. 27. 1940. A. W. OEHLER ET AL Re. 21,542

CORN PICKER

Original Filed Jan. 10, 1936 4 Sheets-Sheet 2

INVENTOR

BY Alvin W. Oehler & Ralph L. Anderson

Brown, Jackson, Boettcher & Dienner

ATTORNEYS.

Aug. 27, 1940. A. W. OEHLER ET AL Re. 21,542

CORN PICKER

Original Filed Jan. 10, 1936 4 Sheets-Sheet 3

INVENTOR

Alvin W. Oehler & Ralph L. Anderson

BY

Brown, Jackson, Boettcher & Dienner

ATTORNEYS.

Aug. 27, 1940. A. W. OEHLER ET AL Re. 21,542

CORN PICKER

Original Filed Jan. 10, 1936 4 Sheets-Sheet 4

INVENTOR
Alvin W. Oehler & Ralph L. Anderson
BY
Brown, Jackson, Boettcher & Dienner
ATTORNEYS.

Reissued Aug. 27, 1940

Re. 21,542

UNITED STATES PATENT OFFICE 21,542

CORN PICKER

Alvin W. Oehler and Ralph L. Anderson, Moline, Ill., assignors to Deere & Company, Moline, Ill., a corporation of Illinois Original No. 2,160,486, dated May 30, 1939, Serial No. 58,449, January 10, 1936. Renewed December 2, 1937. Application for reissue August 19, 1939, Serial No. 292,112

55 Claims. (Cl. 56—18)

The present invention relates generally to agricultural implements and is particularly concerned with implements and the like adapted to be connected with and propelled by a tractor, the whole constituting a complete operative machine.

The principal object of the present invention is the provision of a new and improved agricultural machine comprising corn picking and husking units mounted at opposite sides on a tractor and discharging the ears of corn rearwardly into a wagon or other container pulled at the rear of the tractor.

Another object of the present invention is the provision of a new and improved frame construction for such a machine, embodying a generally U-shaped frame embracing the tractor and connected therewith, together with independently movable wheel means separate from the tractor wheels and arranged to support a substantial portion of the weight of the implement frame and operating units so as to relieve the tractor of such stresses.

A further object of the present invention is the provision of an improved agricultural machine comprising a frame connected with a tractor so as to move therewith and provided with independently movable wheels connected with the implement frame by spring means and toggle mechanism so arranged that each wheel can follow the irregularities of the ground surface, moving independently of both the implement frame and the tractor while at the same time carrying a substantial portion of the weight of the implement frame and operating means thereon.

Another object of the present invention is the provision of an implement frame adapted to be attached to and propelled by a tractor and disposed so that the operating units carried on the frame are arranged in a low-down position, whereby the machine as a whole is not rendered top-heavy or difficult to control and maneuver, and particularly is it an object of the present invention to provide such an implement in which the operating unit or units are carried in substantially fixed relation with respect to the tractor but with separate implement supporting means carrying a substantial portion of the weight of the attachment and movable independently of the tractor while at the same time supporting a full share of the load.

An additional object of the present invention is the provision of an agricultural machine embodying a generally U-shaped frame embracing the propelling tractor and pivotally connected therewith at its rear end and fastened to the frame at its forward end by height adjusting means, whereby the wheels of the tractor in following the ground irregularities serve to gauge the height of operation of the unit or units carried by the frame, in connection with independently suspended weight carrying wheel means serving to relieve the tractor of a substantial portion, and in many cases a major portion, of the weight of the implement itself.

Further, another object of the present invention is the provision of improved implement means detachably connected with a tractor and including a generally U-shaped frame embracing the tractor and having its open end disposed rearwardly, together with elevator means completing the open rear end of the implement frame and detachably connected with the latter so as to permit a ready connection of the implement with and disconnection from the tractor.

Still another object of the present invention is the provision of an improved corn picking and husking machine embodying a detachable elevator and blower means, forming a part of the husking mechanism, detachable with the elevator. In this connection, a further object of the present invention is the provision of improved means for driving the blower from the power take-off of the tractor, which means is arranged to accommodate the relative movement between the implement frame and the tractor when the picking units are adjusted relative to the ground.

A further object of the present invention is the provision of new and improved connections for driving the various operating units from the power take-off of the tractor.

These and other objects and advantages of the present invention will be apparent to those skilled in the art after a consideration of the following detailed description of the preferred structural embodiment, taken in conjunction with the accompanying drawings illustrating such embodiment.

In the drawings:

Figure 5 is a fragmentary section taken along the line 5—5 of Figure 4 and illustrating the disposition of the husking mechanism blower on the supporting bracket for the elevator; and Figure 6 is an enlarged section taken along the line 6—6 of Figure 3.

Figure 1:
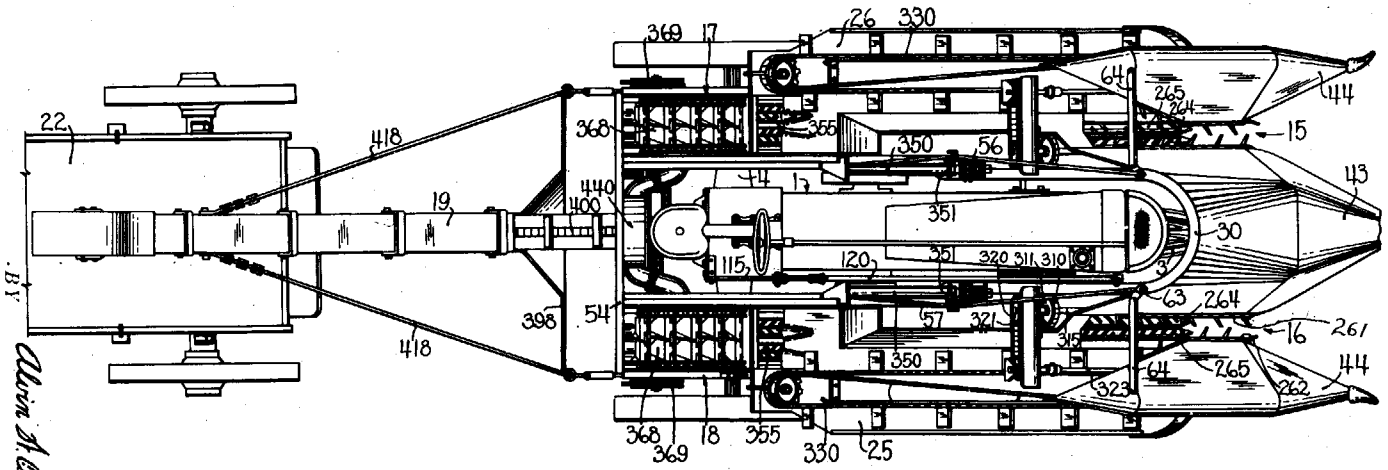
Figure 1 is a plan view of an agricultural machine constructed according to the principles of the present invention.
Figure 2:
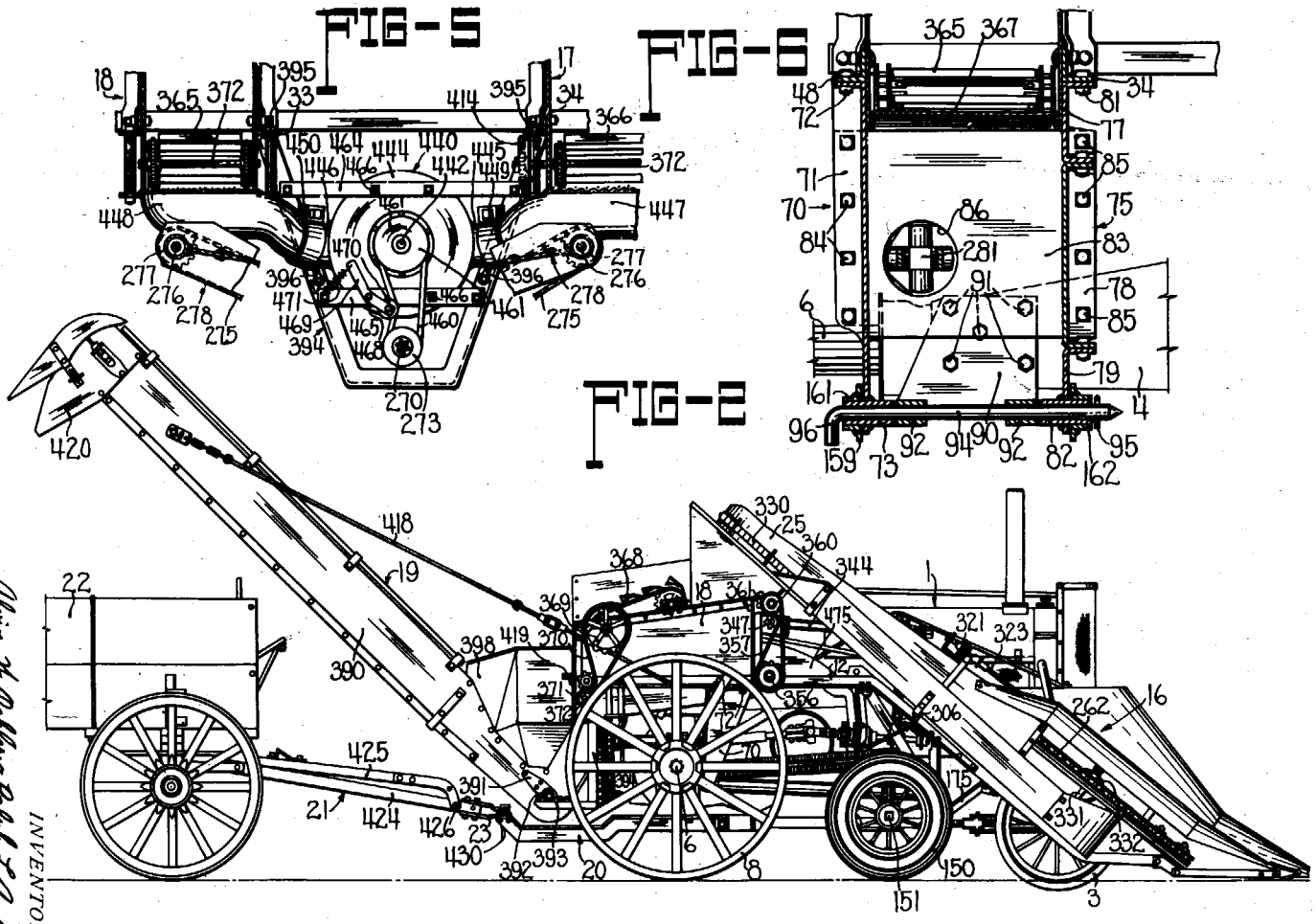
Figure 2 is a side view of the machine shown in Figure 1.

Referring now more particularly to Figures 1 and 2, the tractor upon which most of the operating units are mounted is indicated by the reference numeral 1 and includes a steering truck 2 carrying dirigible wheels 3. The tractor 1 also includes a rear axle housing structure 4 (Figure 4) in which drive axles 5 and 6 are journaled and which at their outer ends adjustably carry rear traction wheels 7 and 8. The tractor 1 receives and is embraced by an implement frame structure of generally U-shaped formation, indicated in its entirety by the reference numeral 12. The U-shaped frame 12 supports a pair of picker units 15 and 16, a pair of husking units 17 and 18, and an elevator 19, the latter being carried on the rear end of the frame 12. The tractor 1 also includes a draw bar structure 20 (Figures 2 and 3) to which the pole 21 of a wagon 22 is connected, as by a clevis 23 or the like, the wagon being disposed relative to the elevator 19 so that the latter discharges the picked and husked ears of corn into the grain box of the wagon. From Figure 1 it will be seen that there is a picker unit and a husker unit at each side of the tractor and that the elevator 19 is disposed centrally at the rear of the tractor. Generally upwardly and rearwardly extending conveyors 25 and 26 form a part of the picker units 15 and 16 and serve to convey the picked ears of corn to the rolls of the husking units 17 and 18.

The main frame 12 of the implement comprises a horizontally disposed U-shaped angle member 30 embracing the forward end of the tractor, as best seen in Figure 1. The ends of the U-shaped frame bar 30 extend rearwardly alongside the front portion of the tractor and terminate in laterally outwardly deflected portions 31 and 32 (Figure 4) to which two generally horizontally disposed frame bars 33 and 34 are secured. These latter frame bars extend fore and aft substantially the entire length of the tractor and terminate, respectively, in downwardly and forwardly disposed portions 35 and 36 (Figures 3 and 4) to which the picker units 15 and 16 are fastened. To each of the frame bars 33 and 34, adjacent the upper ends of the inclined sections 35 and 36 thereof, is rigidly secured a laterally outwardly directed cross frame member 40, best shown in Figure 4. A sub-frame member or angle bar 41 is bolted at its rear end to each of the cross frame members 40, as at 42, and extends forwardly and downwardly alongside the frame bar sections 35 and 36 in generally parallel relation. The sub-frame members 41 thus cooperate with the frame sections 35 and 36 to support the picker units 15 and 16. The latter units are of generally conventional construction, embodying suitable gatherer points 43 and 44 (Figure 1) arranged in close proximity to or in contact with the ground alongside the front tractor wheels 3. The picker units 15 and 16 also include upper and lower gatherer chains of more or less conventional construction but which will be referred to later in connection with the means for driving the various operating units from the power of the tractor motor.

A second pair of sub-frame members 47 and 48 are connected at their forward ends, as at 49, to the cross frame members 40 laterally outwardly of the points of connection 42 of the picker sub-frame members 41. The husker sub-frame members 47 and 48 extend forwardly and downwardly, as at 51 and 52, and also laterally inwardly a short distance, terminating in ends bolted, as at 53, to the picker sub-frame members 41. A cross-frame member 54 at the rear serves to rigidly connect the rear ends of the frame members 34, 34, 47 and 48, the member 54 being detachably fixed in place, since it is necessary to remove this member and associated parts in attaching and detaching the implement to and from the tractor, as will be explained later. A pair of longitudinally extending brace rods 56 and 57 are disposed at opposite sides of the tractor and are anchored at their rear ends, as at 59 (Figures 3 and 4), to the main frame bars 33 and 34. The brace rods 56 and 57 pass over compression struts 60 (Figure 3) fixed to the frame members 33 and 34, the forward ends of the brace rods 56 and 57 being secured, as at 63, to the forward portion of the U-shaped frame member 30, as best shown in Figure 1. Preferably, but not necessarily, the forward ends of the brace or tie rods 56 and 57 are fastened by the same bolts that secure in place the inner ends of the curved yokes 64 that form a part of the picker units.

Figure 3:
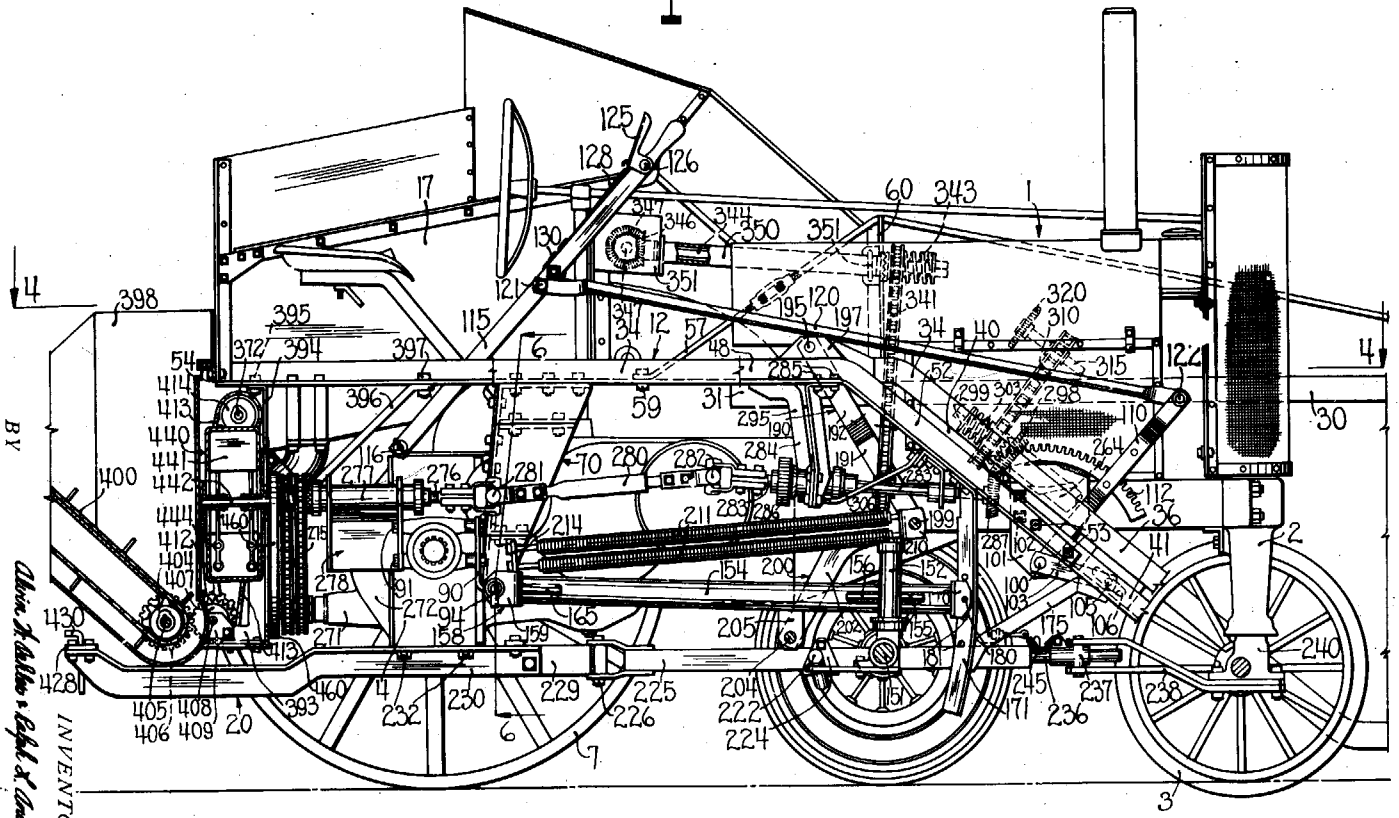
Figure 3 is an enlarged side view, with parts broken away in order to better illustrate the frame construction and certain of the driving connections.

The implement frame 12 is connected at opposite ends to the tractor, one connection taking the form of pivot means permitting the frame to tilt with respect to the tractor while the other connecting means takes the form of adjusting mechanism whereby the front end of the implement frame can be raised or lowered relative to the tractor for the purpose of adjusting the operating position of the picker units with respect to the ground, the position of the forward portions of the picker units thus being gauged by the front wheels 3 of the tractor. The pivot connection between the frame 12 and the tractor 1 is disposed well toward the rear of the frame and, as best shown in Figures 2, 3 and 6, takes the form of a pair of brackets 70, one being disposed at each side of the tractor. Each bracket is of sufficient width to provide for the adequate support of both the inner and outer frame members at each side of the tractor, and since these brackets 70 are duplicates, except that one is right hand and the other left hand, only one will be described in detail.

Referring now to Figure 6, which shows the right hand frame bracket, it will be seen that the bracket comprises a laterally outer standard 71, preferably in the form of an angle member, secured by bolts 72 to the outer or sub-frame member 48 at its upper end, and at its lower end the standard 71 carries a sleeve 73 securely fixed thereto, as by welding or the like. A second or inner standard, indicated in its entirety by the reference numeral 75, is disposed in the plane of the inner or main frame bar 34 and consists of three interconnected members, 77, 78 and 79. The upper end of the first member 77 is bolted as at 81 to the main frame bar 34, and the lower end of the standard section 79 carries a sleeve 82 welded thereto and disposed in axial alignment with the companion outer sleeve 73 fixed to the lower end of the outer standard 71. A plate 83 is bolted, as at 84 and 85, to the vertical standards 71 and 75, the plate being provided with an opening 86 to accommodate the driving shaft for the units carried at the right side of the implement frame, as will be explained later.

Each bracket 70 is pivotally connected at its lower end to the associated end of the tractor rear axle housing 4. In the case of the right hand bracket, a plate 90 is bolted, as at 91, to the end of the tractor rear axle housing and at its lower end is provided with axially aligned trunnions 92. A pivot pin 94 is passed through the sleeves 73 and 82 and the trunnions 92 on the bracket plate 90. The pivot pin 94 is secured in position at its inner end by a cotter pin 95, or by any other suitable means that can be detached or released, and is bent angularly, as at 96, at its other end for the same purpose and also for the purpose of serving as a handle or the like to facilitate the removal of the pin 94 when it is desired to detach the implement from the tractor. The left hand bracket is supported by similar means, and since the brackets 70 are rigidly attached to the rear portion of the implement frame and since the lower ends of the brackets 70 are pivoted to companion brackets carried by the tractor, the implement frame is capable of vertical swinging movement relative to the tractor about the pivot axis defined by the pivot pins 94.

The forward portion of the agricultural implement is connected with the tractor by adjusting means which is capable of being manually controlled so as to govern the position of the frame relative to the tractor. From Figure 3 it will be noted that the downwardly and forwardly disposed portions of the implement frame lie substantially in the vertical transverse plane passing through the tractor front wheels 3 and come fairly close to the ground. The tractor wheels 3 can thus be utilized for gauging the height of the front end of the machine, and the aforesaid adjusting means serves, therefore, to adjust the height of operation of the picker units. The adjusting means comprises a rock shaft 100 (Figures 3 and 4) arranged transversely of the tractor at its forward end and rockably carried in a pair of brackets 101 bolted, as at 102, to the side bars of the tractor frame. Arms 103 are fixed to the outer ends of the adjusting rock shaft 100 and pins 105 are provided at the outer ends of the arms and are suitably disposed in slots 106 formed in the vertical flange of the downwardly and forwardly inclined portions of the associated frame bars 35 and 36.

A controlling arm 110 is fixed to the right hand end of the adjusting shaft 100 and carries suitable latch mechanism 111 (Figure 4) cooperating with a sector 112 (Figure 3) fixed to the right hand bracket 101 so that when the latch mechanism 111 engages the sector, the controlling arm 110 holds the rock shaft in a given angular position, thus determining the elevation of the front end of the implement frame relative to the tractor. An adjusting lever 115 is mounted at the rear of the tractor adjacent the operator's position upon suitable pivot means 116, which preferably includes a pin 117 (Figure 4) carried at one end on an angle bar 118 fixed to the platform at the rear of the tractor. A link 120 connects the lever 15 with the controlling arm 110, the link being pivotally connected, as at 121 and 122, with the lever and arm, respectively. The hand lever 115 carries a grip 125 which is pivoted to the lever at 126 and is connected to a rod 128 that extends longitudinally of the hand lever 115 and, in turn, is connected with a chain 130 which passes around a sheave carried on the hand lever 15. The chain 130 is connected with a forwardly extending link 132 which at its forward end is connected with a second chain section 133 which also passes over a sheave mounted for rotation on the pivot member 122. The lower end of the chain section 133 is connected with the latch mechanism 111 by any suitable means, such as a link 134 (Figure 4), in such a manner that when the hand grip 125 is depressed, the latch mechanism 111 is released from the sector 112, permitting the hand lever 115 to swing the controlling arm 110 either forwardly or rearwardly, thus rocking the shaft 100 and raising or lowering the front end of the implement frame. Releasing the hand grip 125 then permits the latch mechanism 111 to reengage the sector and lock the adjusting shaft 100 in position, thereby holding the implement frame in the adjusted position to which it was moved. Thereafter, the implement frame moves with the tractor in following the irregularities of the ground surface.

While the implement frame 12 and associated operating units are so connected with the tractor that they move therewith as the latter traverses the field, according to the principles of the present invention all of the weight of the implement frame and the operating units is not imposed on the tractor. The present invention includes independently suspended ground engaging wheel means, separate from the tractor wheels, and associated spring means for sustaining a principal part of the weight of the implement frame and operating parts so as to relieve the tractor of these stresses. In the preferred construction, the arrangement of the springs and the wheel suspending means is such that the amount that each wheel supports is about the same, irrespective of the vertical position of the wheel with respect to the frame, within normal operating limits so that each of the implement wheels will follow the contour of the ground, ride over obstructions and follow through depressions and yet carry its proportionate share of the weight of the implement. Preferably, also, the independently suspended wheels, together with the brackets 70, support practically all of the weight of the implement so that only a very small portion, if any, is carried by the adjusting shaft 100 and arms 103 at the front of the tractor.

Figure 4:
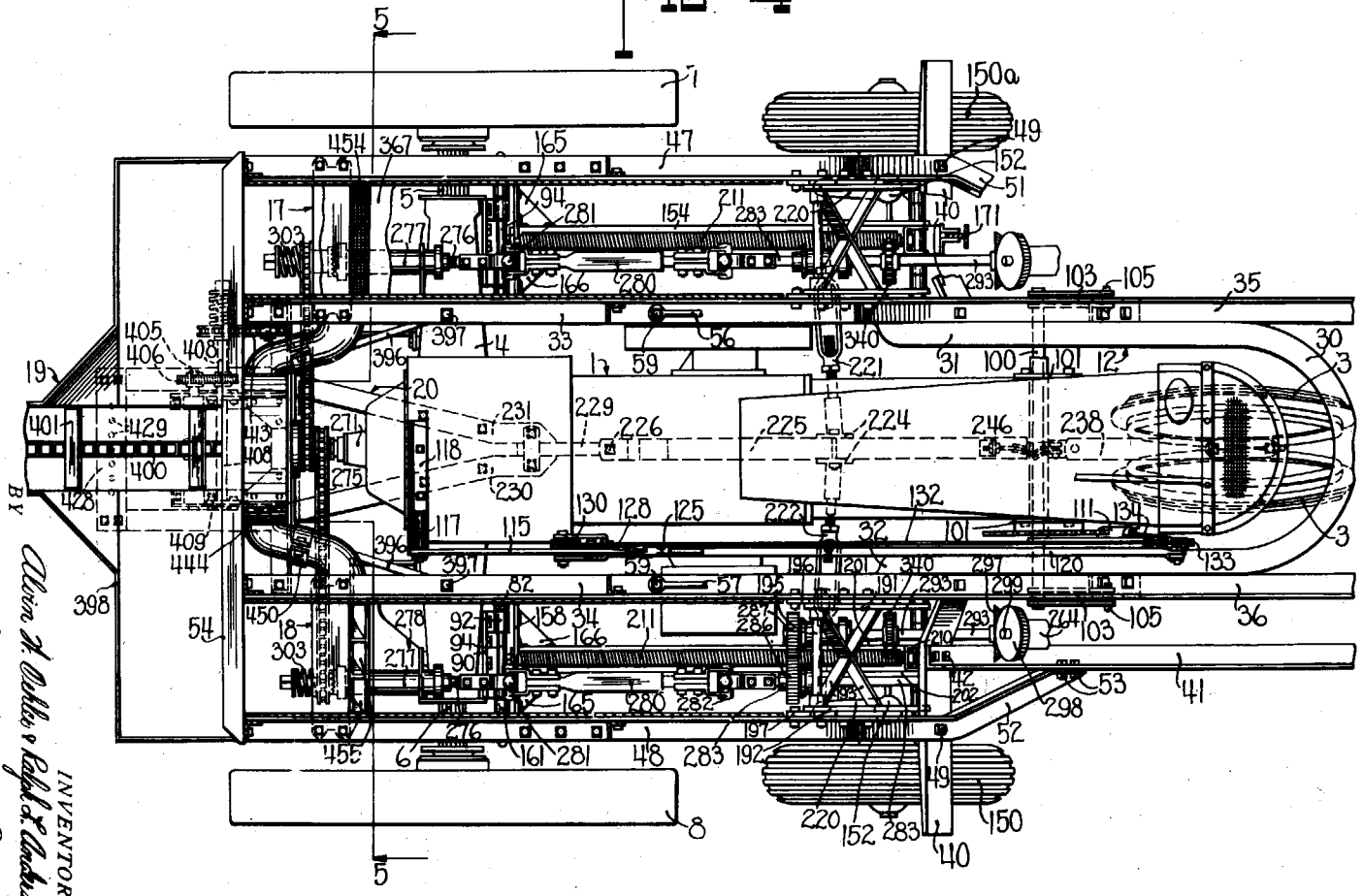
Figure 4 is a top view, corresponding generally to a section taken substantially along the line 4—4 of Figure 3.

Referring now more particularly to Figures 3 and 4, the intermediate portion of the frame of the implement at each side of the tractor has connected thereto the independently suspended wheel unit at that side of the tractor, and since each of the implement wheel units is substantially the same, a description of one will suffice. In Figure 3, the right hand wheel, indicated by the reference numeral 150 in Figure 4, has been removed so as to clarify the showing of the toggle and spring mechanism and associated parts. The wheel 150 is journaled for rotation on a steering axle 151, the latter having a steering spindle journaled for lateral swinging movement in a sleeve 152 secured in rigidly fixed relation to a push bar 154 at the forward end portion of the latter. Preferably, the sleeve 152 is fixedly secured, as by welding, to a laterally outwardly directed bracket or ear 155 which, in turn, is welded, as at 156, to the forward end of the push bar 154. The rear end of the latter is fixedly secured to a U-shaped yoke 158 having rearwardly directed apertured ends 159 and 160 (Figure 6) to which is welded collars 161 and 162 journaled over the outer and inner ends, respectively, of the sleeves 73 and 82 fixed to the lower ends of the bracket standards 71 and 75. The yoke 158 at the rear end of the push bar 154 is reenforced by triangular gusset plates 165 and 166 which may be welded to the yoke 158 and the rear portions of the push bar 154, as best shown in Figure 4. The forward end of the push bar 154 is provided with two spaced angles 170 that embrace and travel vertically along a track member 171 bolted at its upper end to the rear end of the sub-frame member 41. The lower end of the track member 171 is reenforced by a brace 175 which is connected to and extends from the lower end of the track member 171 upwardly and forwardly to a point of connection with the downwardly and forwardly extending frame member 41. By virtue of this means, the up and down swinging of each of the push bars 154 is guided. Aligned openings 180 are formed in the angles 170 and are adapted to register with one of a series of openings 181 formed in the track 171. By inserting a suitable member, such as a pin, the position of the push bar 154 may be fixed, this usually being done when the implement is to be detached from the tractor, as will be explained later.

A toggle mechanism is connected between the implement frame 12 and the vertically swingable wheel 150. Such toggle mechanism comprises an upper toggle link indicated in its entirety by the reference numeral 190 and comprising a laterally rigid structure made up of two spaced bars 191 and 192 (Figure 4) rigidly fastened together by interconnected cross braces 193. At its upper end the link 190 has the upper ends of the bars 191 and 192 apertured and provided with suitable bearing sleeves to receive a pivot pin 195 which is supported in brackets 196 and 197 carried, respectively, by the frame members 34 and 48, being preferably bolted thereto, as best shown in Figure 4. At the lower end of the link 190, the bars 191 and 192 carry an intermediate pivot pin 199 to which the upper end of a lower pivot link, indicated in its entirety in Figure 3 by the reference numeral 200, is connected. The toggle link member 200, like the link member 190, also comprises two bars 201 and 202 (Figure 4) the upper ends of which are apertured to receive the pivot pin 199 and the lower ends of which are pivoted, as by a pin 204, to a bracket 205 fixed to the push bar 154, being welded or otherwise rigidly secured thereto.

A U-shaped clevis 210 is disposed between the toggle links 201 and 202 (Figure 4) and receives the forward ends of a pair of springs 211, the rear ends of which are anchored to an ear 214 fixed to the rear end of the push bar 154, as best shown in Figure 3. The springs 211 exert a constant tendency to straighten out the toggle mechanism 190, 200, thereby loading some of the weight of the implement onto the wheel 150, and preferably the springs are arranged to exert a pull sufficient to sustain practically all of the weight of the implement at the right side of the machine not carried upon the frame bracket 70. The upper ends of the lower pivot bars 201 and 202 are formed to extend forwardly, so as to dispose the pivot pin 199 considerably out of alignment with respect to the upper and lower pivots 195 and 204, and the pin 199 is disposed far enough in advance of the position of the pins 195 and 204 that when the wheel 150 drops into a depression, for example, the somewhat reduced tension of the springs 211 resulting from the rearward movement of the pivot pin 199 is offset by the approach of the toggle links 190 and 200 toward their straightened position, whereby the reduced tension of the springs has a proportionately greater mechanical advantage in loading the weight of the implement frame and operating units onto the independently suspended wheel. When the wheel 150 rides over an obstruction the greater angularity of the links is counterbalanced by the increased tension in the springs 211. By virtue of this arrangement, the amount of weight carried by the wheel is more or less independent of its position relative to the tractor so that each wheel carries its share of the weight of the implement while at the same time following the irregularities of the ground surface.

The implement wheel unit at the left hand side of the machine is substantially the same as has been described above so that a further description thereof is unnecessary, the left-hand wheel, indicated by the reference numeral 150ᵃ, being connected to support its proportional share of the weight of the implement while yet capable of independent vertical movement by toggle and spring mechanism which preferably is substantially identical with that just described. Accordingly, the same reference numerals employed above have been applied to the wheel unit at the left side of the machine.

The right and left implement wheels 150 and 150ᵃ are connected to swing about their vertical axes, defined by the spindle sleeves 152, in the proper steering relation with respect to the dirigible wheels 3 of the tractor by means which is substantially the same as the steering arrangement shown in the patent issued June 11, 1935, to Wilbur J. Coultas and Norman F. Andrews, No. 2,004,720, to which reference may be had if desired. Referring now more particularly to Figure 4, the wheel spindles 152 carry steering arms 220 which extend rearwardly and at their inner ends pivotally receive adjustable steering links 221 and 222. The innermost ends of the adjustable links 221 and 222 are pivoted to a pair of brackets 224 fixed to opposite sides of a longitudinally disposed tube 225. The rear end of the tube 225 is pivoted, as at 226, to an arm 229 that is rigidly connected to and forms a part of the forward ends of the members 230 and 231, constituting the draw bar 20, which are bolted at 232 (Figure 3) to the rear axle housing 4 of the tractor.

The front end of the steering tube 225 carries a stub shaft extension 236 which is slidably received in a trunnion block 237 to which the upper and lower bars of a rearwardly extending steering arm 238 are pivotally connected. The arm 238 is rigidly secured to the intermediate portion of the dirigible front wheel spindle structure 240 so as to swing angularly therewith about the vertical steering axis defined by the front bracket forming a part of the front truck 2 of the tractor. Accidental withdrawal of the bar 236 from the sleeve 237 is prevented by a chain connection 245 between the member 237 and the front end of the tube 225, the chain 245 being connected to the forward end of the tube 225 by a bracket 246, as best shown in Figure 4. If desired, the member 237 may be fixed to the stub shaft 236 and the latter may be made slidable within the forward end of the steering tube 225.

The picket units 15 and 16 of the husking units 17 and 18, as mentioned above, are mounted upon the implement frame 12, the units 15 and 17 being on the left side of the tractor 1 and the units 16 and 18 being mounted on the implement frame at the right side of the tractor. The present invention is not concerned with the particular details per se of these units, it being sufficient to mention that the picker and husker details may be similar to those employed in the harvester shown in the patent issued July 24, 1934, to Wilbur J. Coultas and Norman F. Andrews, No. 1,967,498, to which reference may be had if necessary. In general, each of the picker units includes inner and outer sets of gatherer chains 261 and 262 operating in conjunction with an inner snapping roll 264 and an outer snapping roll 265 (Figure 1). According to the present invention, however, the two picker units 15 and 16 are driven by separate connections with the power take-off shaft of the tractor 1.

The power take-off shaft of the tractor, indicated by the reference numeral 270 in Figure 5, is journaled for rotation in a sleeve extension 271 carried by the differential cover plate unit 272 of the rear axle housing 4, as best shown in Figure 3. The power take-off shaft 270 of the tractor carries a pair of driving sprockets, and also a driving pulley 273 (Figure 5), which will be referred to later. The forward driving sprocket on the power take-off shaft 270 of the tractor is connected by a sprocket chain 275 with a suitable sprocket carried at the rear end of a driving shaft 276 that is journaled in a bearing sleeve 277 carried on a bracket 278 bolted to the right hand portion of the tractor rear axle, preferably by the same bolts 91 that fasten the bracket 90 in position, although this is not necessary.

A telescopic shaft 280 is connected by universal joints 281 and 282 with the driving shaft 276 carried on the tractor as aforesaid and with the rear end of a shaft 283 journaled in a depending bracket 284 bolted, as at 285, to the outer or subframe member 48. A gear 286 on the shaft 283 is in mesh with a companion gear 287 fixed to the rear end of a picker drive shaft 293 journaled in a bracket 295. The forward end of the shaft 293 carries a bevel gear 294 (Figure 4) which is in mesh with a companion bevel gear 298 fixed to the rear end of the supporting shaft 299 of the inner picker roll 264. The outer picker roll 265 is driven from the inner roll by any suitable means, such as a pair of spur gears or the like. If desired, a slip clutch 303 may be operatively associated with the shaft 276 on the tractor so as to prevent overloading any of the associated parts. Preferably, the bracket 284 supporting the shaft 283 is reenforced by a brace 306 bolted to the cross frame member 40 and adjustably secured to the lower end of the bracket 284, as best shown in Figure 3. By virtue of the slip or telescopic shaft 280 and associated universal joint connections with the shafts 276 and 283, the drive from the power take-off of the tractor to the picker unit is effective at all times while accommodating any relative movement between the implement frame 12 and the tractor, such as occurs when the adjusting means 115, 100 is actuated to raise or lower the gathered points 43 and 44.

The picker unit at the left side of the tractor is driven by connections which, for all practical purposes, are substantial duplicates of the parts just described. Therefore further description is unnecessary, and the same reference numerals have been employed to indicate corresponding parts of the drive for the left hand picker unit 15.

Referring again to the right hand picker unit 16, the power for driving the gatherer chains 261 and 262 is derived from the shaft 299 of the inner picking roll 264. Referring first to Figure 3, a sprocket is mounted on the shaft 299 and is preferably connected therewith through a slip clutch 309, and a chain 310 is trained over the aforesaid sprocket and over a sprocket 311 (Figure 1) fixed to the upper portion of a shaft 316 that extends downwardly and forwardly and is operatively connected with the inner gatherer chain 261 to drive the same. The uppermost end of the shaft 315 carries another sprocket 320 over which a chain 321 is trained so as to drive a shaft 323, the latter having a sprocket at its upper end receiving the chain 321, and the shaft 323 is connected to drive the outer gatherer chain 262. The gatherer chains for the left hand unit are driven in the same manner, and hence a further description is unnecessary.

The right and left hand elevator units 25 and 26 are driven, respectively, by suitable connections with the outer gatherer chain of each of the associated picker units. In the case of the right hand elevator unit 25, the elevator chain of this unit, indicated at 330 (Figures 1 and 2), is trained at its lower end over a sprocket (not shown) fixed to the lower end of a shaft 331 which at its upper end carries a sprocket 332 (Figure 2) driven from the gatherer chain 262. The elevator chain 330 of the left hand unit 26 (Figure 1) is driven in the same manner.

Each of the husker units 17 and 18 is driven by an appropriate connection with the picker driving shaft at that side of the tractor. As best shown in Figure 4, the inner picking roll drive shaft 293 carries a sprocket 340 over which the lower end of a husker driving chain 341 (Figure 3) is trained. In Figure 3, the lower portion of the driving chain 341 for the right hand unit is shown in full lines while the upper portion of the driving chain 341 for the left hand unit is shown in dotted lines. The upper end of chain 341 for the left hand unit is trained over a sprocket connected through a slip clutch 343 with the forward end of a husker drive shaft 344. The rear end of the shaft 344 is connected by a pair of bevel gears 346 with a tranversely disposed husker drive shaft 347, the drive shaft for the left hand unit 17 being indicated in Figure 3 and the drive shaft 347 for the right hand unit 18 being shown in Figure 2. Each of the shafts 344 is supported by a tubular member 350 which is fixed to the frame by suitable brackets 351. The husking rolls 355 (Figure 1) of the right hand unit 18 are driven from the shaft 347, and the husk conveyor in the lower portion of the hucker casing is driven from a shaft 356 (Figure 2) by a sprocket and chain connection 357, including an adjustable idler sprocket 360 carried in a slotted bracket 361 fixed to the upper forward portion of the husker unit frame. In Figure 5, the husk conveyor for the right hand unit is indicated by the reference numeral 365, and the conveyor for the left hand unit is indicated by the reference numeral 366. Each includes a more or less conventional slat conveyor operating over a plate bottom 367 (Figure 4), and each of the husker units also includes an ear retarder mechanism 368 driven from a sprocket 369 that is connected by a chain 370 with a sprocket 371 fixed to a shaft 372 at the rear end of the husk conveyor. Thus, the ear retarder mechanism for each unit is driven from the rear end of the associated husk conveyor for that unit.

The elevator 19 at the rear end of the machine is preferably supported from the rear ends of the implement frame bars 33 and 34. To this end, the sides of the elevator housing 390 carries brackets 391 (Figure 2) fixedly secured thereto and provided with sleeve portions journaled over bearings 392 carried by rearwardly extending arms 393 that are fixed to or formed as an integral part of a generally vertically disposed U-shaped supporting bracket 394. The latter is fastened at its upper end, as best shown in Figure 5, to the rear ends of the frame bars 33 and 34 by bolts 395 and is reenforced by braces 396 which are also secured at their upper ends to the frame bars 33 and 34 by bolts 397 or the like. The lower portion of the elevator housing 390 carries a laterally extended hopper 398 which is adapted to receive the ears of corn discharged from both of the husking units 17 and 18.

The elevator 19 includes an elevating chain 400 provided with paddles 401 (Figure 4) and is trained at its lower end over a sprocket 404 (Figure 3) mounted on an elevator drive shaft 405. The shaft 405 is journaled in the bearings 392 that receive the elevator housing supporting brackets 391, as set forth above. The shaft 405 extends outwardly of the housing at the left end, as indicated in dotted lines in Figure 4, and carries a gear 406 that meshes with a gear 407 carried by a shaft 408 suported by suitable brackets 409 carried on the rearwardly extending arms 393 that support the lower end of the elevator housing. One end of the shaft 408 carries a sprocket 412 (Figure 3) around which is trained the sprocket chain 413 that extends upwardly to a sprocket 414 mounted on the laterally inwardly extended end of the rear husk conveyor shaft 372 for the left hand unit 17, as indicated in Figure 5. Thus, the left hand husker unit 17 serves to drive the elevator 19 serving both of the husker units 17 and 18. The elevator 19 is held in proper inclined position by adjustable tension rods 418, and preferably, but not necessarily, the hopper 398, receiving the ears of corn from the two husker units 17 and 18, is fixed to and forms an integral part of the housing 390 of the elevator 19. As best indicated at 419 in Figures 2 and 3, the elevator hopper 397 is cut away to accommodate the removable rear cross frame member 56.

The discharge spout 420 of the elevator 19 empties into the wagon 22, and the pole 21 of the wagon is preferably one that includes two sections 424 and 425 hinged together, as best indicated in Figure 2, by a hinge pin 426. When being drawn by the picker in rear of the latter, the front pole section 425 is folded back upon the rear section 424. The latter section carries the clevis 23 which is connected in draft transmitting relation to the draw bar 20 of the tractor, as previously mentioned, by a hitch plate 428 (Figure 4) fixed to the rear ends of the bars 230 and 231 forming the tractor drawbar 20. Preferably, the hitch plate 428 is provided with a number of holes 429 in any one of which the clevis pin 430 may be disposed.

The generally U-shaped bracket 394 upon which the elevator 19 is carried also serves as a support for a blower 440 operatively associated with both of the husking units 17 and 18 for the purpose of removing husks and the like and discharging them onto the ground. Referring now more particularly to Figures 3, 4 and 5, the blower comprises a rotor 441 (Figure 3) fixed to a shaft 442 journaled for rotation on the blower casing 444 (Figure 5). The latter is provided with a pair of oppositely disposed outlets 445 and 446 which are connected, respectively, to ducts 447 and 448 by detachable bands 449 and 450. The ducts 447 and 448 receiving the discharged blast of air from the blower 440 are carried, respectively, as fixed parts of the husker units 17 and 18. The ducts 447 and 448 discharge upwardly into the the rear ends of the husking boxes through screened openings 454 in the plate bottoms thereof, as best shown in Figure 4. Preferably, the discharge ends of the ducts 447 and 448 are provided with divided passageways, as indicated at 455 for the right hand unit in Figure 4.

The blower 440 is driven directly from the power take-off shaft 270 of the tractor by a connection comprising a belt 460 (Figure 5) trained over the pulley 273 and over a pulley 461 fixed to the forward end of the blower shaft 442. A pair of cross members 464 and 465 are disposed in vertically spaced relation and securely bolted to the supporting bracket 394, as best shown in Figure 5. The cross braces or members 464 and 465 receive and support the blower 440, the latter being secured to the braces by bolt means 466 or the equivalent. The lower brace 465 also carries a pivot pin 468 upon which a belt tightener 469 is mounted. The belt tightener 469 includes a pulley 470 urged against the belt 460 by a spring 471. Remembering that there is relative movement between the frame 12, and the elevator structure carried at the rear end thereof, and the tractor when the front end of the implement is adjusted vertically, it will be seen that the belt tightener 469 serves to keep the belt 460 taut as the machine is adjusted about the pivot axis 94 by means of the lifting lever 115.

In operation, assuming that the implement frame and all of its operating units have been properly mounted and connected, the machine is adapted to traverse two rows of corn, these stalks being guided into the picking rolls by the gatherer points 43 and 44. Usually, the adjusting lever 45 is so disposed that these parts run along the ground in order to pick up any down or leaning stalks. The operation of the picking rolls removes the ears of corn, together with most of the husks attached thereto, and the ears are then picked up by the conveyors 25 and 26 and moved rearwardly, preferably by the laterally inner runs of the chains 330, and discharged into the husking units 17 and 18, coming into engagement with the husking rolls 355 and pressed down thereagainst by the ear retarder means 368. Each of the husker units is driven, as pointed out above, from the associated driving connections for the picker unit at that side of the machine, and the operation of the units 17 and 18 result in the removal of the husks, silks and the like from the ears of corn, the blower directing a blast of air upwardly through the screened openings 454 of both units, forwardly between the upper and lower runs of the conveyors 365 and 366, and finally upwardly through the upper runs, carrying away the husks, silks and the like out of the forward end of the machine where such material is deflected downwardly by any suitable means, such as the shields indicated at 475 in Figure 2. The husked ears of corn are discharged rearwardly from the rear ends of the husker units 17 and 18 into the elevator hopper 398 from which they are picked up by the elevator chain 400 and carried rearwardly and upwardly and finally discharged over the spout 420 into the wagon 22 pulled at the rear of the machine. As the machine traverses the ground, the independently movable wheels 150 and 150a follow any irregularities of the ground surface, but the toggle mechanism serves at all times to support a substantial portion of the weight of the implement and associated operating units.

When it is desired to detach the implement from the tractor, it is a relatively simple matter to remove the few parts to be disconnected and move back the tractor out from between the sides of the U-shaped frame. First, the supporting brackets 394, carrying the blower 440 and the elevator 19, is removed by disconnecting the bolts 395 and the bolts 397 holding the diagonal braces 396 in place. Next the elevator drive chain 413 and the blower drive belt 460 are removed, and lastly the cross frame member 54 is detached. The implement frame 12 is then tilted to its forwardmost position by moving the adjusting lever 115 forwardly, and then the forward ends of the push bars 154 are fixed to the associated tracks 171 by inserting pins through the registering openings 180 and 181. This maintains the implement supporting wheels 150 and 150a in rigid relation with respect to the implement frame 12. A jack is then placed under the rear end of each of the push bars 154 and adjusted to take the weight of the rear end of the implement off the pins 94, and when this is done the cotter pins 95 are detached and the pins 94 removed.

Next, the steering connections are released by disconnecting the brackets 224 from the tubular member 225, whereby the links 221 and 222 will drop out of the way of the front wheels 3 of the tractor. The tilting connection is released by removing the pins 105 associated with the arms 103 of the rock shaft 100. The tractor can then be backed free of the implement, and during such movement the telescopic shaft connections 280 automatically separate. If desired, of course, the bolts holding the universal joints 281 to the forward end of the shafts 276 may be removed.

While we have shown and described above the preferred structure in which the principles of the present invention have been embodied, it is to be understood that our present invention is not to be limited to the specific details shown and described above, but that, in fact, widely different means may be employed in the practice of the broader aspects of our invention, as set forth in the appended claims.

What we claim, therefore, and desire to secure by Letters Patent is:

1. The combination with a tractor, of an agricultural implement comprising a frame, means rigidly connecting the frame with the tractor so as to move bodily therewith, operating means supported by said frame, and ground engaging wheel means movably connected with said frame so as to accommodate movement of the frame with the tractor relative to the ground and arranged to support a principal portion of the weight of the frame and the operating means carried thereby.

2. The combination with a tractor having supporting wheels, of an agricultural implement comprising a frame fastened to the tractor and movable therewith, operating means carried by said frame including parts disposed relatively close to the ground and gauged with respect thereto by the wheels of the tractor, and separate wheel means connected with the implement frame so as to move with respect to the implement frame when the tractor traverses irregularities in the ground, said separate wheel means being adapted to support a substantial portion of the weight of said frame and said operating means during their relative movement with respect to said implement frame.

3. The combination with a tractor having front and rear wheels, of an implement comprising a frame embracing the tractor and fastened thereto, operating units carried at each side of the tractor and having portions disposed alongside the front wheels of the tractor closely adjacent to the ground, said front wheels serving thereby as gauge means for determining the position of said operating units relative to the ground, and separate wheel means movable relative to both the tractor and the implement frame and biased so as to support a substantial portion of the weight of the implement frame and the operating units supported thereby.

4. The combination with a tractor, of an agricultural implement comprising a frame, operating means carried by said frame, means fastening the frame to the tractor so as to move with the latter, and load supporting wheel means movable independently of the tractor and operatively connected with said frame for supporting a substantially constant portion of the weight of the implement frame and operating means, independently of the position of the supporting wheel means relative to either the tractor or the frame.

5. The combination with a tractor, of an agricultural implement comprising a frame connected with the tractor so as to move therewith, a pair of toggle links pivotally connected at one end with said frame, independently movable supporting wheel means connected with the lower end of each of said toggles, and spring means biasing said toggle links for movement so as to subject said wheel means to a substantial portion of the weight of said implement frame and associated parts while accommodating the independent movement of said wheel means relative to the tractor and said frame.

6. The combination with a tractor, of an agricultural implement comprising a generally U-shaped frame embracing the tractor, downwardly extending brackets fastened to said frame and pivotally connected with the tractor to support at least a portion of the weight of the frame on the latter, adjusting mechanism connecting the forward portion of said frame with the tractor so that the frame moves with the latter, supporting wheel means movable independently of both the tractor and said frame and each including rearwardly extending push bars connected to swing vertically about the pivot axes established by said brackets, and spring mechanism connecting said wheel means with said frame for supporting at least a portion of the weight of the latter on said wheel means.

7. The combination with a tractor having front steering wheels and a rear axle housing, of an agricultural implement comprising a frame of substantially horizontal U-shape with the open ends of the frame at the rear of the tractor and embracing the latter, downwardly extending supporting brackets carried by the sides of said frame, means pivotally connecting the lower ends of said brackets to the rear axle housing of the tractor, a forward portion of said frame being disposed adjacent the transverse plane of the front wheels of the tractor, and adjusting mechanism connecting the front portion of said frame with the tractor and shiftable to vary the position of the frame relative to the tractor.

8. The combination with a tractor, of an agricultural implement comprising a generally horizontally disposed U-shaped frame embracing the tractor and having its ends extending rearwardly, downwardly extending bracket means fastened to the rear ends of said frame and pivotally connecting the latter to the rear axle housing of the tractor, the forward portion of said frame including generally downwardly and forwardly disposed parts arranged closely adjacent to the front wheels of the tractor, picking rolls mounted for rotation on said downwardly and forwardly extending portion of the implement frame, means adjustably fixing the front portion of said frame to the tractor so that the front wheels of the latter serve as gauging means for the forward ends of said picking rolls, husking mechanism disposed at each side of the tractor on the rearwardly disposed end portions of said U-shaped frame substantially over said downwardly extending brackets and including parts disposed adjacent the operator's position on the tractor and below the upper portions of the rear wheels of the tractor, and conveying mechanism extending from said picking rolls to said husking means.

9. The combination with a tractor, of an agricultural implement comprising a generally U-shaped frame means with the open ends disposed rearwardly and provided with downwardly and forwardly extending parts disposed adjacent the front wheels of the tractor, bracket means connected with the rear ends of said frame means and pivotally connected with the tractor for adjusting movement relative thereto about a transverse axis, an adjusting rock shaft mounted on the front portion of the tractor, arms fixed to the ends of said rock shaft and movably connected with certain of the downwardly and forwardly extending portions of said frame means, whereby the rotation of said rock shaft adjusts the position of the front end of said frame means relative to the tractor, and adjusting mechanism operatively connected with said rock shaft for controlling the position thereof.

10. The combination with a tractor having front and rear wheels and rear axle housing and associated shafts connected with the latter, of an agricultural implement frame detachably connected with the tractor and comprising a generally U-shaped frame bar embracing the forward portion of the tractor, generally horizontally disposed frame bars connected with the ends of said U-shaped member and extending alongside the tractor in parallel relation, the front ends of said horizontal frame members extending forwardly and downwardly to points adjacent the front wheels of the tractor, a cross member connected to each of said forwardly and downwardly extending frame bars, a second frame member carried laterally outwardly of and in generally parallel relation with respect to said horizontal frame member, the forward end of said second horizontal member being connected with the associated cross member and extending downwardly and forwardly therefrom, and bracket means rigidly connected to the two parallel frame members at each side of the implement frame and extending downwardly and pivotally connected to the rear axle housing of the tractor.

11. The combination with a tractor having front and rear wheels and rear axle housing and associated shafts connected with the latter, of an agricultural implement frame detachably connected with the tractor and comprising a generally U-shaped frame bar embracing the forward portion of the tractor, generally horizontally disposed frame bars connected with the ends of said U-shaped member and extending alongside the tractor in parallel relation, the front ends of said horizontal frame members extending forwardly and downwardly to points adjacent the front wheels of the tractor, a cross member connected to each of said forwardly and downwardly extending frame bars, a second frame member carried laterally outwardly of and in generally parallel relation with respect to said horizontal frame member, the forward end of said second horizontal member being connected with the associated cross member and extending downwardly and forwardly therefrom, bracket means rigidly connected to the two parallel frame members at each side of the implement frame and extending downwardly and pivotally connected to the rear axle housing, a laterally rigid toggle link disposed at each side of the tractor and connected at its upper end to both of said parallel frame bars at that side and appreciably forward of the bracket at that side, a second link completing the toggle and connected at its upper end to the lower end of said first toggle link, wheel supporting means connected at the lower end of each of said second toggle links, a push bar at each side of the tractor operatively connected with the wheel means at that side, and spring means arranged to exert a force tending to straighten said toggle links, whereby the effect of said spring means is to cause said wheel means to support a substantial portion of the weight of said implement frame, the tension of said spring means decreasing as the associated toggle links are moved toward their straightened position.

12. The combination with a tractor having a power take-off, of an agricultural implement comprising a generally U-shaped frame having downwardly and forwardly extending portions at each side of the tractor, a set of picking rolls disposed at each side of the tractor and journaled for rotation in said downwardly and forwardly extending frame portions, bracket means carried by said frame portions at each side of the tractor, a shaft journaled in each of said brackets and operatively connected to drive said picking rolls, means supporting said frame for adjustment relative to the tractor, a second set of brackets carried on the tractor, one at each side thereof, a shaft mounted in each of said last named brackets and operatively connected to be driven from the power take-off of the tractor, and means including telescopic shaft sections operatively connecting said tractor supported shafts with said picking roll shafts and providing for relative movement therebetween to accommodate adjustment of said frame relative to the tractor.

13. The combination with a tractor having a power take-off, of an agricultural implement comprising a generally U-shaped frame embracing the tractor and supported at least in part thereby, the forward portion of said frame including generally downwardly and forwardly extending parts, a picking unit disposed at each side of the tractor and supported on the downwardly and forwardly extending parts at that side, means for driving each of said units including a generally longitudinally disposed shaft journaled for rotation on said frame, means for driving said shafts from the power take-off, a husking unit disposed on each side of the tractor and carried at the rear thereof on the end portions of the implement frame, and means for driving each of said husking units from the drive shaft for the associated picking unit at that side of the tractor.

14. The combination with a tractor, of an agricultural implement comprising a generally U-shaped frame having downwardly and forwardly extending portions at the front of the tractor, picking units carried thereby, one at each side of the tractor, a pair of husking units disposed on opposite sides of the tractor and carried at the rear end of said frame, means for driving the husking and picking units on one side of the tractor, means for driving the husking and picking units on the other side of the tractor, an elevator unit carried at the rear end of said frame in a position to receive material coming from both of said husking units, and means for driving said elevator unit from one of said husking units.

15. The combination with a tractor, of an agricultural implement comprising a generally U-shaped frame embracing the tractor and disposed horizontally on opposite sides thereof, means fixing the implement frame to the tractor, the ends of said frame extending rearwardly, picking and husking units carried on said frame, a generally downwardly disposed bracket fastened at the rear of said frame to both of the ends thereof, and an elevator unit fastened to said bracket and disposed at the rear of the tractor in a position to receive material from both of said husking units.

16. The combination with a tractor having a power take-off shaft extending from the rear end thereof, of an agricultural implement comprising a generally U-shaped frame disposed in a horizontal position with the ends of the frame extending rearwardly, means fixing the implement frame to the tractor, a husking unit and a picking unit carried by said frame at each side of the tractor, the picking units being carried at the forward portion of said frame and the husking units being carried on the rear end portions of said frame, means for driving said husking and picking units from the power take-off of the tractor, a downwardly disposed bracket having its upper end portions connected, respectively, to the rear ends of said implement frame, a blower arranged to deliver a blast of air to each of said husking units and supported by said bracket adjacent the power take-off of the tractor, means driving said blower from said power take-off, and an elevator unit disposed to the rear of the tractor and carried upon said bracket in a position to receive material from both of said husking units.

17. The combination with a tractor having a power take-off shaft at the rear thereof, of an agricultural implement comprising a generally U-shaped frame having its intermediate portion embracing the front of the tractor and its ends disposed rearwardly, operating means including a picking unit and a husking unit carried by said frame at each side of the tractor, means pivotally connecting the rear portion of said frame with the tractor, adjusting mechanism movably connecting the front portion of said frame with the tractor, means for driving said husking and picking units from the power take-off of said tractor, an elevator unit disposed at the rear of the tractor and including elevating means and a sub-frame carrying one end of the elevating means and detachably connected with the rear ends of said U-shaped frame, a blower carried by said sub-frame and detachable with said elevator unit from the tractor, said blower being adapted to direct a blast of air into both of the husking units, and detachable means for driving said blower from the power take-off of said tractor.

18. The combination with a tractor having a power take-off, of an agricultural implement comprising a generally U-shaped frame embracing the forward portion of the tractor, operating units supported on said frame at each side of the tractor, a drive shaft for each of said units journaled for rotation on said frame, a pair of shafts journaled for rotation on the tractor and operatively connected with the power take-off of the latter, and telescopic sections connecting the shafts at each side of the tractor and providing for the disconnection of said driving connections by relative rearward movement of the tractor with respect to said frame.

19. The combination with a main supporting unit, of an auxiliary unit comprising a frame connected with the supporting unit so as to move therewith, ground engaging means connected with said frame for movement with respect thereto, and means reacting against said frame and biasing said ground engaging means for downward movement for causing the latter to support a substantial portion of the weight of said frame and associated parts.

20. The combination with a tractor, of an agricultural implement comprising a frame connected with the tractor so as to move therewith, means movably connected with said frame, supporting wheel means connected with said means, and spring means biasing said movable means for movement so as to subject said wheel means to a substantial portion of the weight of said implement frame and associated parts while accommodating the movement of said wheel means relative to the tractor and said frame.

21. The combination with a tractor, of an agricultural implement comprising a frame, means pivotally connecting said frame adjacent one end thereof with the tractor so as to support at least a portion of the weight of the frame on the latter, adjusting mechanism connected adjacent the other end of said frame and with the tractor so that the frame moves with the latter, supporting wheel means movable independently of both the tractor and said frame, and spring mechanism connecting said wheel means with said frame for supporting at least a portion of the weight of the latter on said wheel means and accommodating said independent movement thereof relative to the tractor and said frame.

22. The combination with a tractor, of an agricultural implement comprising a generally U-shaped frame embracing the tractor, means connecting said frame with the tractor so as to cause the frame to move therewith at all times, an operating unit supported on said frame and extending to a point adjacent the ground at the forward end of the tractor, supporting wheel means movable independently of both the tractor and said frame so as to follow irregularities in the ground surface, and spring mechanism connecting said wheel means with said frame so as to load a substantial portion of the weight of the frame and said unit on said wheel means while gauging the position of the operating unit in accordance with the front end of the tractor independently of the position of said wheel means relative to said frame.

23. The combination with a tractor, of an agricultural implement comprising a generally horizontally disposed U-shaped frame embracing the tractor and having its ends extending rearwardly, bracket means fastened to the rear ends of said frame and pivotally connecting the latter to the tractor, the forward portion of said frame including generally downwardly and forwardly disposed parts arranged closely adjacent to the front wheels of the tractor, picking rolls mounted for rotation on said downwardly and forwardly extending portion of the implement frame, means fixing the front portion of said frame to the tractor so that the front wheels of the latter serve as gauging means for the forward ends of said picking rolls, husking mechanism disposed at each side of the tractor on the rearwardly disposed end portions of said U-shaped frame and including parts disposed adjacent the operator's position on the tractor and below the upper portions of the rear wheels of the tractor, and conveying mechanism extending from said picking rolls to said husking means.

24. The combination with a tractor, of an agricultural implement comprising a frame, operating means carried by said frame, means fastening the frame to the tractor so as to move with the latter, load supporting wheel means movable independently of the tractor and frame, means for guiding the movement of the wheel means relative thereto, and means for loading a substantial portion of the weight of the implement frame and operating means on said supporting wheel means while accommodating the movement of the latter relative to the tractor and the frame.

25. The combination with a tractor, of an agricultural implement supported thereon and movable coadunatively therewith, wheel means separate from the tractor for supporting a portion of the weight of the implement, and means for connecting said wheel means to the implement for vertical movement relative thereto and to said tractor.

26. The combination with a tractor, of an implement having a frame, means connecting said frame to the tractor in a fixed position relative thereto, wheel means separate from the tractor, connections for connecting said wheel means movably with said frame, and means for applying a yielding upthrust through said connections against said frame.

27. The combination with a tractor, of an implement having a frame, means connecting said frame to the tractor including means for adjustably fixing the position of said frame relative to said tractor, wheel means separate from the tractor and having movable connections between said wheel means and said frame, and means for applying a yielding upthrust through said connections against said frame.

28. The combination with a tractor having supporting wheels, of an agricultural implement comprising a frame fastened to the tractor and movable coadunatively therewith, operating means carried by said frame including parts disposed relatively close to the ground and gauged with respect thereto by the wheels of the tractor, and separate wheel means operatively connected with the implement frame so as to support a portion of the weight of said implement.

29. The combination with a tractor, of an implement having a frame, means connecting said frame to the tractor including means for adjustably fixing the position of said frame relative to said tractor, wheel means connected to said frame and movable vertically relative thereto, and spring means exerting a lifting force on said frame and reacting against said wheel means, thereby relieving the tractor of a portion of the weight of said implement.

30. The combination with a tractor, of an implement having a frame, means connecting said frame to the tractor including means for adjustably fixing the position of said frame relative to said tractor, wheel means connected to said frame and movable vertically relative thereto, spring means exerting a lifting force on said frame and reacting against said wheel means, and spring disabling means for optionally locking said wheel means and said frame against relative vertical movement.

31. The combination with a tractor, of an implement having a frame, means connecting said frame to the tractor including means for adjustably fixing the position of said frame relative to said tractor, wheel means connected to said frame and movable vertically relative thereto, spring means exerting a lifting force on said frame and reacting against said wheel means, and spring disabling means for optionally locking said wheel means to said frame in various positions of said wheel means relative to said frame.

32. The combination with a tractor having steering means, of an implement having a frame, means connecting said frame to said tractor including means for adjustably fixing the position of said frame relative to the tractor, auxiliary supporting wheels connected to said frame and movable vertically relative thereto, spring means exerting a lifting force on said frame and reacting against said wheel means, and means responsive to said tractor steering means for steering said auxiliary wheels.

33. In combination with a tractor having a longitudinally extending body, a transversely disposed rear axle housing, and front and rear carrying wheels, an implement comprising a frame, means for pivotally supporting said frame on said rear axle housing for vertical swinging movement relative to said tractor, means for adjustably fixing said frame relative to said tractor, and a ground engaging element for supporting a portion of the weight of said implement, said element being movably connected with said implement and having resilient means acting downwardly upon said element and reacting against said implement for determining the loading upon said ground engaging element.

34. The combination with a tractor, of an agricultural machine comprising a frame, pivot means for supporting at least a portion of the weight of said frame on said tractor for vertical swinging movement relative thereto, adjusting mechanism connecting said frame to said tractor at a point spaced from said pivot means for holding said frame rigid with respect to said tractor, supporting wheel means movable independently of both the tractor and said frame including fore and aft extending wheel supporting members connected to said tractor for vertical swinging movement, and spring mechanism connecting said wheel means with said frame for supporting at least a portion of the weight of the latter on said wheel means.

35. In combination with a tractor having a longitudinally extending body, a transversely disposed rear axle housing, and front and rear carrying wheels, a harvesting implement comprising a gathering unit connected at its rear end to said rear axle housing and extending forwardly alongside the tractor body, securing means, spaced longitudinally from said connection of said gathering unit, for fixing the position of the latter relative to the tractor, supporting wheel means movable vertically independently of both the tractor and implement, and spring mechanism acting downwardly upon said wheel means and reacting upwardly upon said implement for supporting at least a portion of said implement on said wheel means.

36. The combination with a tractor of an implement having a frame, means for connecting said frame to the tractor in normally fixed relation thereto, auxiliary supporting wheels for said frame, and means for connecting said wheels to said frame, said connecting means providing for vertical movement of said wheels relative to said frame and also for rotation of each of said wheels about vertical axes.

37. In combination, a vehicle frame, front and rear supporting wheels therefor, an implement frame supported on said vehicle frame and movable relative thereto, means for adjustably fixing said implement frame relative to said vehicle frame, an additional supporting wheel movable relative to said implement frame and to said vehicle frame and connected to one of said frames and means acting downwardly upon said additional wheel and upwardly against one of said frames for determining the weight carried by said wheel.

38. In combination, a vehicle frame, front and rear supporting wheels therefor, an implement frame supported on said vehicle frame and movable relative thereto, means for adjustably fixing said implement frame relative to said vehicle frame, an additional supporting wheel movable relative to said implement frame and to said vehicle frame and connected to one of said frames, means acting downwardly upon said additional wheel and upwardly against one of said frames for determining the weight carried by said wheel, and means for steering said additional wheel.

39. In combination, a vehicle frame, front and rear supporting wheels therefor, an implement frame supported on said vehicle frame and movable relative thereto, means for adjustably fixing said implement frame relative to said vehicle frame, a pair of additional supporting wheels disposed intermediate said vehicle supporting wheels, lever arm means connecting said wheels with said implement frame permitting vertical movement of said wheels relative to said implement frame and providing for swinging of each of said wheels about vertical axes, and spring means coacting with said lever arm means, for determining the weight carried on said additional wheels.

40. In combination with a tractor having a body supported on fore and aft carrying wheels, an implement comprising a frame, means for pivotally supporting said frame on said tractor body, means for adjustably fixing said frame on said body at a point spaced from said pivot means, a pair of additional supporting wheels for said frame disposed on opposite sides of the tractor intermediate of said fore and aft supporting wheels, means for connecting said wheels to said implement frame, said connecting means providing for independent vertical movement of said wheels relative to said frame and providing for horizontal swinging movement of said wheels, and means acting through said connecting means, for determining the weight carried on said additional wheels.

41. In combination with a tractor having a body supported on fore and aft carrying wheels, a corn harvesting implement including a gathering unit disposed alongside the tractor body and having a frame supported thereon in normally fixed position relative thereto, an additional supporting wheel for said implement frame disposed intermediate said fore and aft carrying wheels, a wheel supporting vertical spindle associated with said additional wheel, a longitudinally extending arm pivoted to said implement frame for vertical swinging movement, said spindle being swingably mounted on said arm for movement about a substantially vertical axis, spring means connected between said arm and said implement frame and acting to force said arm downwardly relative to said frame whereby a portion of the weight of said frame is carried on said wheel.

42. In combination, a vehicle frame, front and rear supporting wheels therefor, an attachment frame, means for detachably mounting the latter frame rigidly on said vehicle frame, an additional supporting wheel connected to said attachment frame for vertical movement relative thereto, and yielding means acting downwardly upon said additional supporting wheel and reacting upwardly against said attachment frame, said means being adjustable to determine the proportion of weight carried by said additional wheel.

43. In combination, a vehicle frame, front and rear supporting wheels therefore, an attachment frame, means for detachably connecting the latter frame to said vehicle frame, an additional supporting wheel spaced longitudinally of said front and rear vehicle supporting wheels, means for connecting said additional wheel to said attachment frame for vertical movement relative thereto and for pivotal movement relative to said attachment frame about a substantially vertical axis, and means acting downwardly upon said additional wheel and upwardly against said attachment frame for determining the weight carried by said wheel.

44. In combination, a vehicle frame, front and rear supporting wheels therefor, an attachment frame, means for detachably connecting the latter frame to said vehicle frame, an additional supporting wheel spaced longitudinally of said front and rear vehicle supporting wheels, means for connecting said additional wheel to said attachment frame for vertical movement relative thereto and for pivotal movement relative to said attachment frame about a substantially vertical axis, and means acting downwardly upon said additional wheel and upwardly against said attachment frame for determining the weight carried by said wheel, said last named means being adjustable to determine the proportion of weight carried by said additional wheel.

45. In combination, a vehicle frame, front and rear supporting wheels therefor, an attachment frame, means for detachably connecting the latter frame to said vehicle frame, an additional supporting wheel spaced longitudinally of said front and rear vehicle supporting wheels, means for connecting said additional wheel to said attachment frame for vertical movement relative thereto and for pivotal movement relative to said attachment frame about a substantially vertical axis, means acting downwardly upon said additional wheel and upwardly against said attachment frame for determining the weight carried by said wheel, and means for steering said additional wheel.

46. In combination, a vehicle frame, front and rear supporting wheels therefor, an attachment frame, means for detachably connecting the latter frame to said vehicle frame, an additional supporting wheel spaced longitudinally of said front and rear vehicle supporting wheels, means for connecting said additional wheel to said attachment frame for vertical movement relative thereto and for pivotal movement relative to said attachment frame about a substantially vertical axis, means acting downwardly upon said additional wheel and upwardly against said attachment frame for determining the weight carried by said wheel, said last named means being adjustable to determine the proportion of weight carried by said additional wheel, and means for steering said additional wheel.

47. In combination, a wheel supported vehicle frame, an attachment frame mounted on said vehicle frame in normally fixed relation thereto, an additional supporting wheel movable relative to said attachment frame and to said vehicle frame and connected to one of said frames, and means acting downwardly upon said additional wheel and upwardly against one of said frames for determining the weight carried by said wheel.

48. The combination set forth in claim 47 wherein said means is arranged to act upwardly against said attachment frame.

49. In combination, a wheel supported vehicle frame, an attachment frame mounted on said vehicle frame in normally fixed relation thereto, an additional supporting wheel movable relative to said attachment frame and to said vehicle frame and connected to one of said frames, means acting downwardly upon said additional wheel and upwardly against one of said frames for determining the weight carried by said wheel, and means for optionally connecting said wheel rigidly to one of said frames to prevent relative movement therebetween.

50. In combination, a vehicle frame, front and rear supporting wheels therefor, an attachment frame, means for detachably mounting the latter frame on said vehicle frame, an additional supporting wheel connected to said attachment frame for vertical movement relative thereto, yielding means acting downwardly upon said additional supporting wheel and reacting upwardly against said attachment frame, and means for optionally connecting said wheel rigidly to said attachment frame to prevent said relative vertical movement to provide for supporting said attachment frame rigidly upon said wheel when the vehicle frame is removed from the attachment frame.

51. The combination with a tractor having a relatively narrow body supported on laterally spaced rear traction wheels and on a front truck of a width not greater than the width of the tractor body, of an agricultural implement having frame members disposed on opposite sides of the tractor, means pivotally connecting said frame members to the tractor for vertical movement with respect thereto, a pair of picking units mounted on said frame members near the front end of the tractor and on opposite sides thereof, respectively, a pair of husking units rigidly mounted on said frame members adjacent the rear of the tractor and on opposite sides of the latter, respectively, an elevator unit for receiving corn from said husking units, said elevator unit being detachably pivotally mounted on the rear ends of said husking units whereby the tractor may be driven forwardly between said frame members into operative position with respect to said implement upon removal of said elevator unit.

52. The combination with a tractor, of an agricultural implement comprising a pair of downwardly and forwardly extending frame sections disposed on opposite sides of the tractor, respectively, means connecting said sections together, means for pivotally mounting said frame sections on the tractor providing for vertical swinging movement relative thereto, a picking unit mounted on each of said frame sections at the forward end thereof, a pair of husking units disposed on opposite sides of the tractor and rigidly mounted on the rear ends of said frame sections, respectively, means for driving said husking and picking units, a bracket interconnecting the rear ends of said husking units across the rear of said tractor, an elevator carried on said bracket and extending upwardly and rearwardly therefrom and adapted to receive corn from both of said husking units, said elevator and said bracket being detachable from said husking units to permit the tractor to be driven into and out of the implement, and means swingably connected to said implement providing for vertical movement relative thereto and engaging the ground for supporting the implement while the latter is detached from the tractor.

53. The combination with a tractor, of an agricultural implement comprising a frame including frame sections extending along opposite sides of the tractor, bracket means for pivotally mounting said frame on the rear axle housing of the tractor for vertical movement relative thereto about a transverse axis, the forward portion of said frame including generally downwardly and forwardly disposed parts arranged closely adjacent to the front wheels of the tractor, picking rolls mounted for rotation on said downwardly and forwardly extending portion of the implement frame, means adjustably fixing the front portion of said frame to the tractor so that the front wheels of the latter serve as gauging means for the forward ends of said picking rolls, husking mechanism disposed at each side of the tractor on the rear ends of the frame sections above said bracket means, and ground engageable means carried on the implement for supporting the latter when the latter is detached from the tractor.

54. The combination with a tractor, of an agricultural implement comprising a pair of fore and aft extending frame sections spaced laterally to receive a tractor therebetween during operation, means for supporting said implement on the tractor to move coadunatively therewith including means for adjustably fixing one end of the frame to the tractor so that the front wheels of the latter serve as gauging means for the implement, and supporting means swingably attached to the implement frame and adapted to be fixed thereto for supporting the implement on the ground when the tractor is removed, said supporting means also serving to support a portion of the weight of the implement when the latter is in operating position on the tractor.

55. The combination with a tractor, of a tractor mounted implement comprising a pair of fore and aft extending frame sections spaced laterally to receive a tractor therebetween during operation, picking mechanism disposed on the forward ends of said sections and husking mechanism disposed on the rear ends of said frame sections, means for supporting said implement on the tractor to move coadunatively therewith including means for adjustably fixing one end of the frame to the tractor in several adjusted positions relative thereto so that the front wheels of the tractor serve as gauging means for the implement, supporting means pivotally connected thereto for vertical swinging movement about a transverse axis and adapted to be fixed relative to the implement frame for supporting the implement on the ground when detached from the tractor, permitting the tractor to be driven out from between the frame sections, said supporting means also serving to support a portion of the weight of the implement when the latter is in operating position on the tractor, bracket means disposed across the rear of the tractor and fixed to the rear ends of the two frame sections during operation but removable therefrom when the tractor is removed, and an elevator supported on said bracket for receiving material from said husking mechanisms and delivering the same rearwardly therefrom.

ALVIN W. OEHLER.
RALPH L. ANDERSON.